(12) United States Patent
Janson

(10) Patent No.: US 6,416,143 B1
(45) Date of Patent: Jul. 9, 2002

(54) MOBILE STORAGE SYSTEM

(75) Inventor: Steven L. Janson, Deerfield, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 0 days.

(21) Appl. No.: 09/328,478

(22) Filed: Jun. 9, 1999

(51) Int. Cl.$^7$ .............................................. A47B 53/02
(52) U.S. Cl. ...................... 312/201; 312/199; 403/256
(58) Field of Search ................................ 312/111, 198, 312/199, 201; 403/256, 257, 247, 349

(56) References Cited

U.S. PATENT DOCUMENTS

| | | | |
|---|---|---|---|
| 1,321,167 A | | 11/1919 | Voigt |
| 2,162,318 A | | 6/1939 | Schmitz |
| 2,684,277 A | | 7/1954 | Hamacher |
| 3,080,204 A | | 3/1963 | Lindhgren |
| 3,330,601 A | * | 7/1967 | Proctor .................. 403/349 X |
| 3,423,781 A | * | 1/1969 | Henson .................. 403/349 X |
| 3,640,595 A | * | 2/1972 | Staller et al. ........... 312/199 X |
| 3,865,446 A | | 2/1975 | Mastronardi |
| 3,923,354 A | | 12/1975 | Young |
| 3,957,323 A | | 5/1976 | Tucker et al. |

(List continued on next page.)

FOREIGN PATENT DOCUMENTS

| | | | | |
|---|---|---|---|---|
| DE | 197 06 246 | | 10/1997 | |
| EP | 053955 | | 9/1992 | |
| FR | 2426431 | | 12/1979 | |
| GB | 2183147 | * | 6/1987 | ................ 312/201 |
| GB | 2194781 | * | 3/1988 | ................ 312/201 |
| GB | 2225928 | * | 6/1990 | ................ 312/201 |

OTHER PUBLICATIONS

Ultrastor High Density Storage Brochure, Stewart Systems, P.O. Box 680625, Franklin, TN 37068, undated.

*Primary Examiner*—Peter M. Cuomo
*Assistant Examiner*—Hanh V. Tran
(74) *Attorney, Agent, or Firm*—Boyle, Frederickson, Newholm, Steine & Gratz S

(57) ABSTRACT

A storage assembly includes a storage cabinet removably mounted to a wheeled base which is supported by a supporting surface such as a floor. A guide assembly is interconnected with the floor and the base for guiding movement of the base in a longitudinal direction, so as to provide movement of the storage cabinet between an extended position and a retracted position in response to application of an axial pull-out or push-in force to the cabinet. The guide assembly includes an inner mounting member secured to the floor, and an extendible and retractable guide mechanism extends from the inner mounting member. The guide mechanism may be in the form of a telescoping drawer slide assembly including a fixed-position member secured to the inner mounting member and an extension member secured to and interconnected with the base and slidably mounted to the fixed-position guide member. A floating engagement arrangement is provided between the extension member and base so as to provide relative vertical movement between the base and the extension member as the base is moved on the floor, to accommodate unevenness in the floor. A releasable retainer mechanism is interposed between the base and the guide assembly for releasably retaining the storage cabinet in either its extended position or its retracted position. The storage cabinet is removably mounted to the base by a removable mounting arrangement which requires a minimum number of tools to secure the storage cabinet to the base and which provides quick and easy mounting and demounting of the storage cabinet relative to the base. A shim system is engaged with the base for providing the dual function of locating the comers of the storage cabinet relative to the base and for selectively shimming one or both sides of the storage cabinet to adjust the position of the storage cabinet relative to the base.

48 Claims, 6 Drawing Sheets

U.S. PATENT DOCUMENTS

| | | |
|---|---|---|
| 3,967,868 A | 7/1976 | Baker, Jr. |
| 4,017,131 A | 4/1977 | Camenisch |
| 4,033,649 A | 7/1977 | Naito et al. |
| 4,039,040 A | 8/1977 | Spears et al. |
| 4,076,202 A | 2/1978 | McConnell |
| 4,084,125 A | 4/1978 | King |
| 4,123,126 A | 10/1978 | Querengasser |
| 4,229,135 A | 10/1980 | Malmros |
| 4,256,355 A | 3/1981 | Yamaguchi et al. |
| 4,307,922 A | 12/1981 | Rhodes, Jr. |
| 4,412,772 A | 11/1983 | Naito et al. |
| 4,417,524 A | 11/1983 | Quinn et al. |
| 4,421,365 A | 12/1983 | Taniwaki |
| 4,441,617 A | 4/1984 | Forsberg |
| 4,467,924 A | 8/1984 | Morcheles |
| 4,523,794 A * | 6/1985 | Peterman .................... 312/201 |
| 4,597,615 A | 7/1986 | Steger |
| 4,621,876 A | 11/1986 | Reimer |
| 4,657,317 A | 4/1987 | Gemma |
| 4,702,535 A | 10/1987 | Beun |
| 4,705,315 A | 11/1987 | Cherry |
| 4,708,411 A | 11/1987 | Peterman |
| 4,759,341 A | 7/1988 | McFarland |
| 4,789,210 A | 12/1988 | Weiss et al. |
| 4,911,507 A * | 3/1990 | Leist .......................... 312/201 |
| 5,072,838 A | 12/1991 | Price, Jr. et al. |
| 5,082,178 A | 1/1992 | Muth et al. |
| 5,160,189 A | 11/1992 | Johnston et al. |
| 5,160,190 A | 11/1992 | Farrell et al. |
| 5,205,627 A | 4/1993 | Davison et al. |
| 5,265,739 A | 11/1993 | Price, Jr. et al. |
| 5,410,899 A * | 5/1995 | McConnell ............. 403/257 X |
| 5,417,486 A | 5/1995 | Manlove |
| 5,435,639 A | 7/1995 | Smits et al. |
| 5,439,281 A | 8/1995 | Croker |
| 5,443,312 A | 8/1995 | Schluter |
| 5,597,217 A | 1/1997 | Hoska et al. |
| 5,598,934 A | 2/1997 | Krummell et al. |
| 5,636,750 A | 6/1997 | Heyl |
| 5,670,778 A | 9/1997 | Smith |
| 5,683,155 A | 11/1997 | Sarno |
| 5,924,779 A * | 7/1999 | Krumholz ............... 312/201 X |
| 5,944,400 A | 8/1999 | Fulterer |
| 6,027,190 A | 2/2000 | Stewart |

* cited by examiner

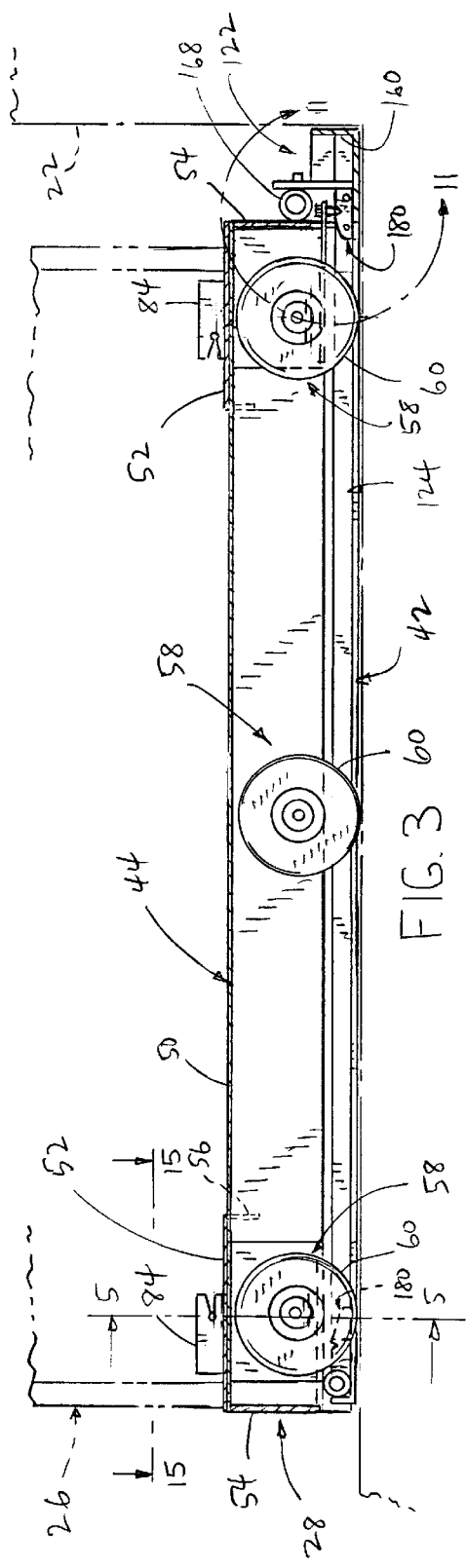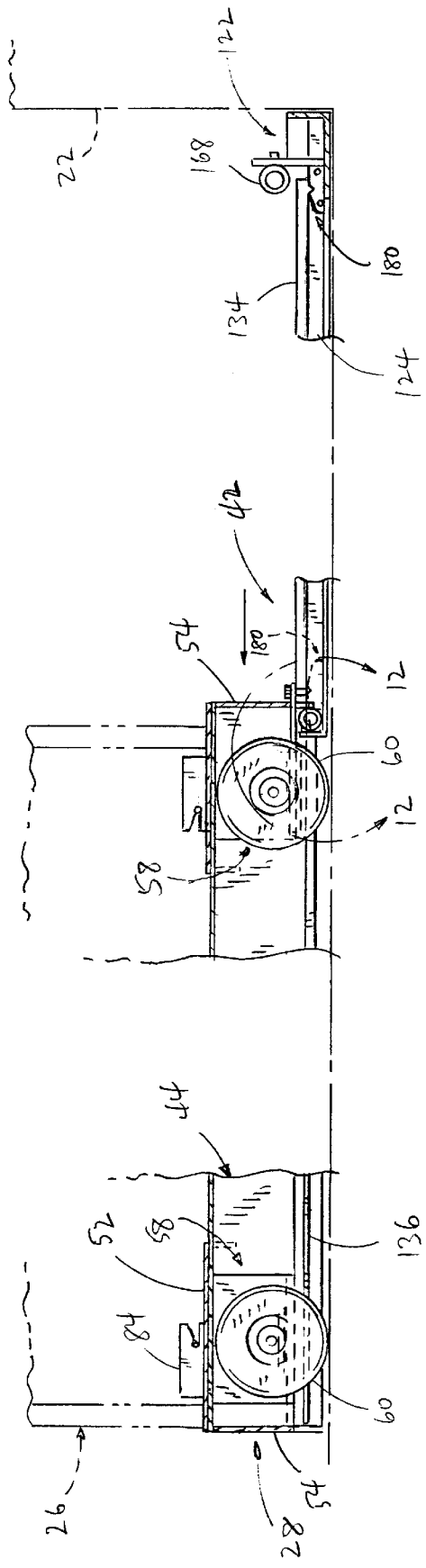

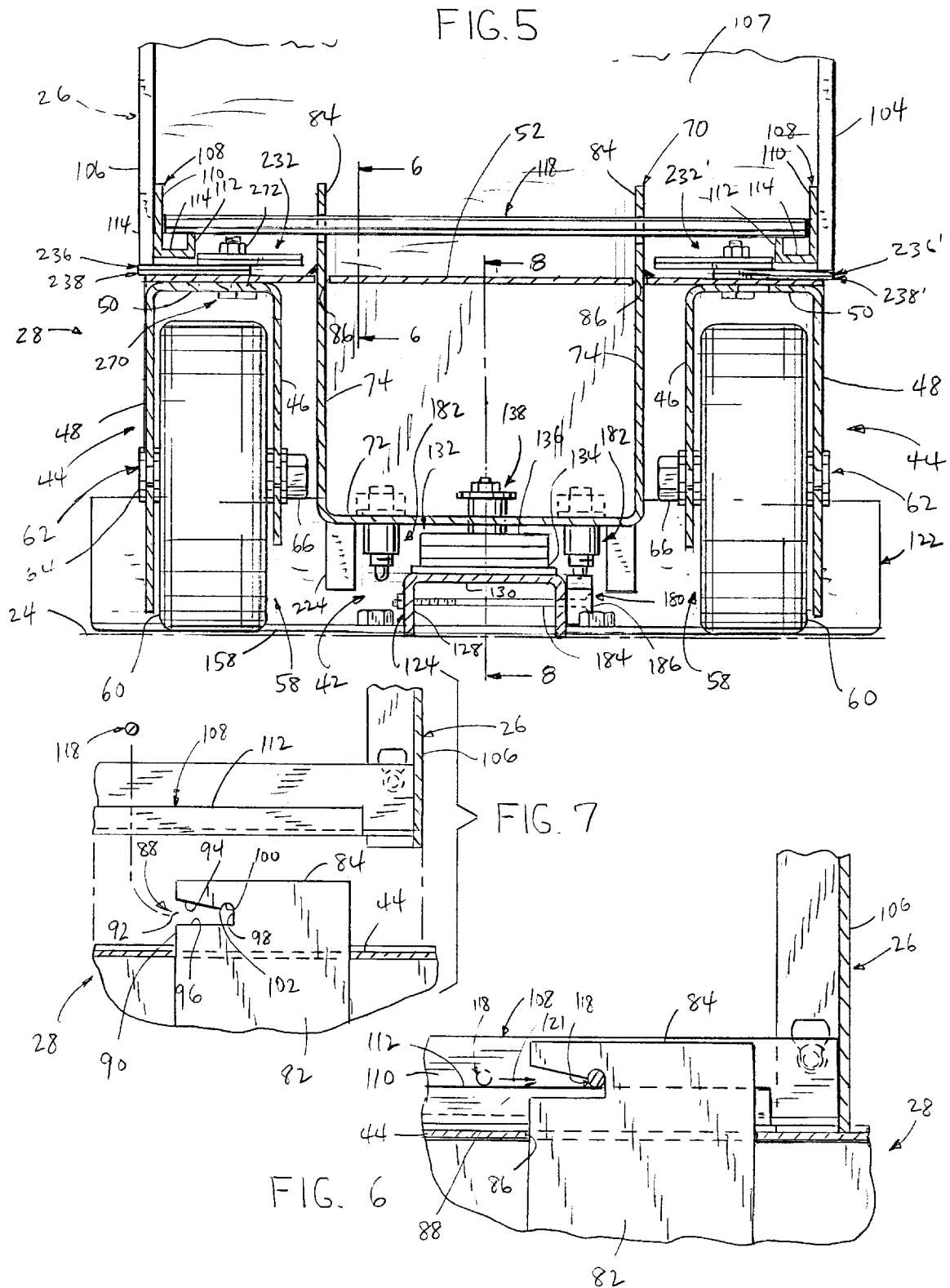

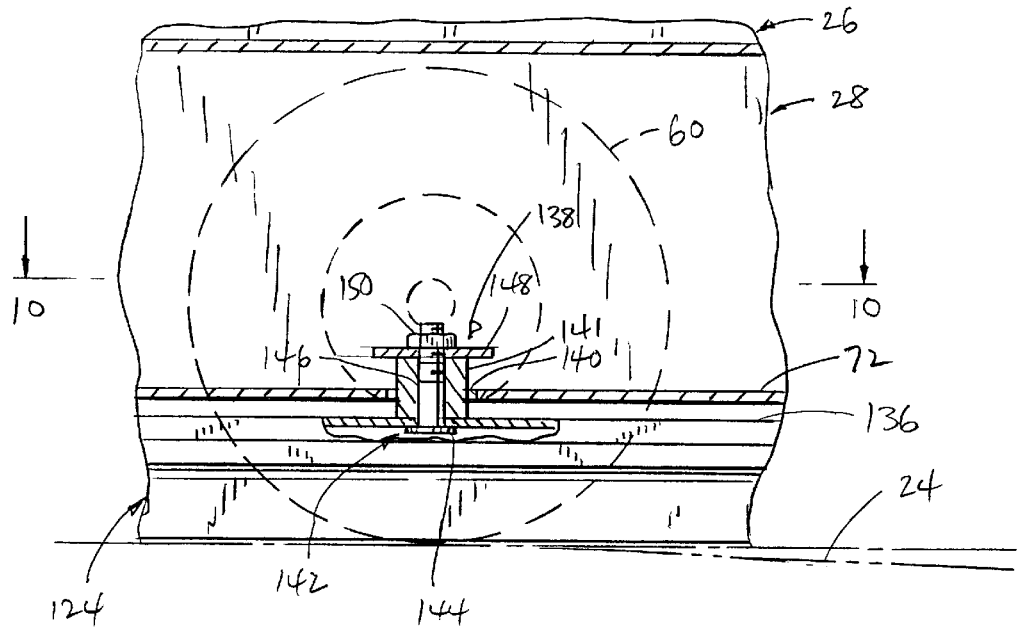
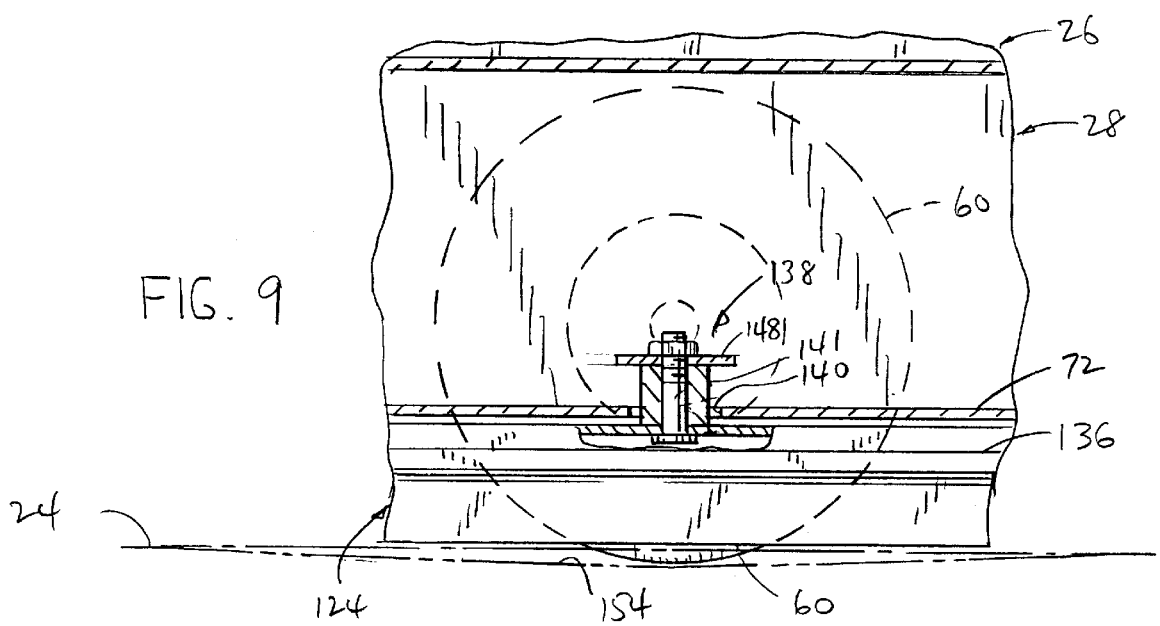
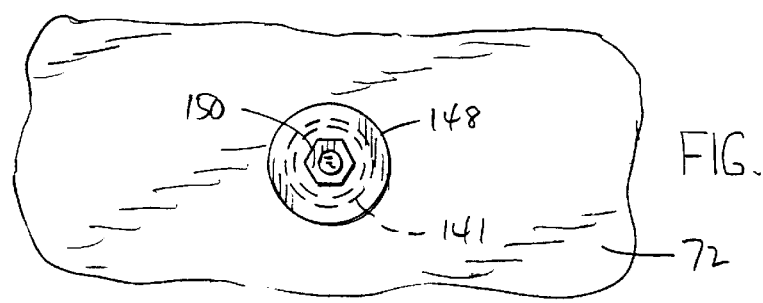

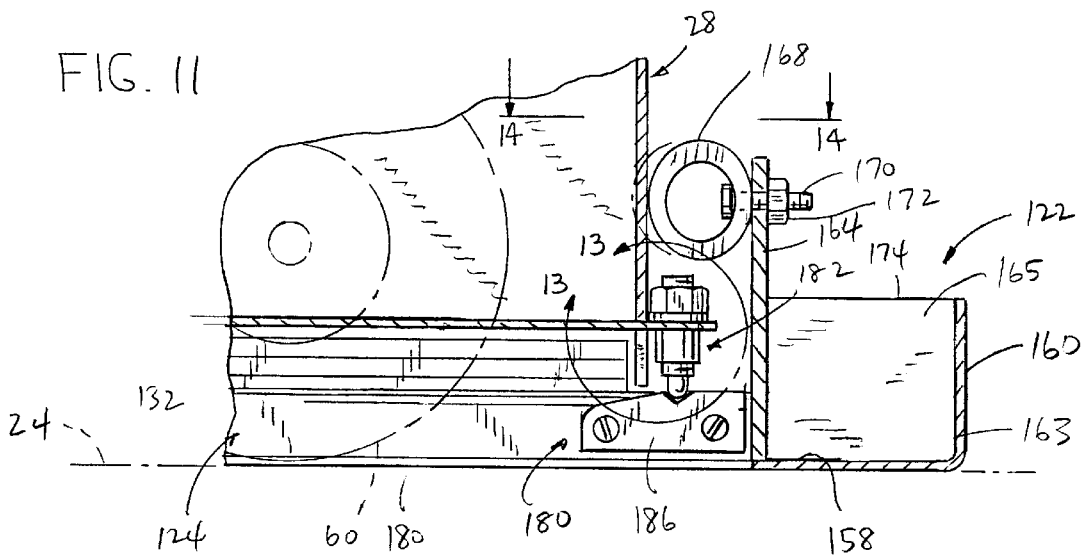
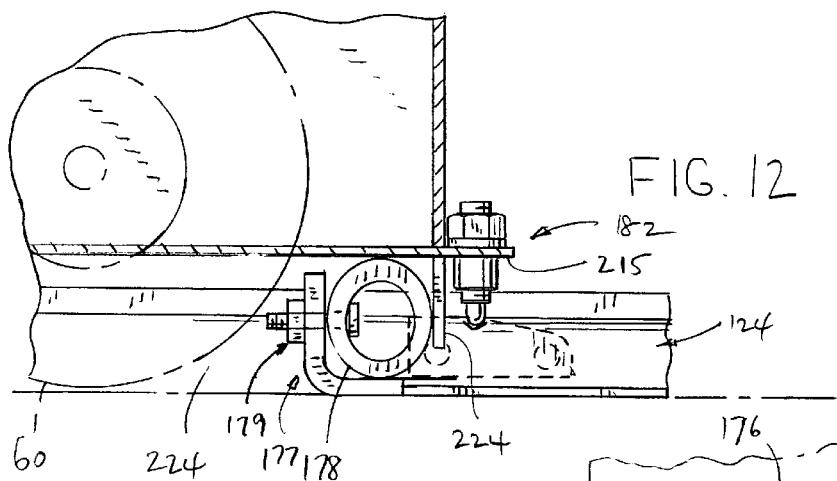
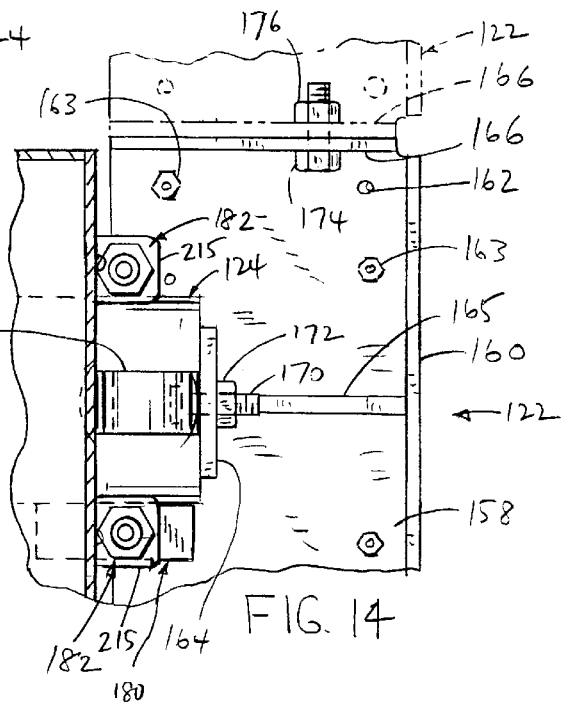

MOBILE STORAGE SYSTEM

BACKGROUND AND SUMMARY OF THE INVENTION

This invention relates to storage systems, and more particularly to a high density storage arrangement in which a series of storage cabinets are mounted side-by-side, without aisles between adjacent cabinets, and in which the storage cabinets can be moved between an extended, access position and a retracted, storage position.

Conventional storage or shelving systems employ a number of storage cabinets which are placed onto a supporting surface such as a floor, with an aisle between adjacent cabinets so as to provide access to the front of each cabinet. This type of an arrangement is suitable for low density applications, since significant floor space is required for the aisles between adjacent cabinets.

High density storage systems place adjacent cabinets close together and eliminate the aisles between cabinets. In one type of system, the cabinets are movable on lateral tracks mounted in the supporting surface, so as to separate adjacent cabinets to form an aisle so as to provide access to the front of a desired one of the cabinets. Systems of this type typically utilize a number of carriages which are movably mounted to the tracks, and a number of storage cabinets are mounted to each carriage. This type of system greatly increases the efficiency of a given amount of storage space by eliminating the aisles between adjacent storage cabinets.

The above-described type of high density storage system is very suitable in situations where the storage space can accommodate a number of rows of storage cabinets, with each row being made up of a number of storage cabinets. In some applications, however, high density storage is required in spaces which cannot accommodate several cabinets in a row, or in spaces in which a large number of single cabinets are placed in a side-by-side relationship. To provide high density storage in such spaces, it is known to mount a storage cabinet to a structure which allows the cabinet to be moved between a retracted, storage position and an extended, access position. The storage cabinets are placed in a closely packed, side-by-side arrangement such that there is very little space between adjacent cabinets. To gain access to items stored on one of the cabinets, the cabinet is moved to its extended, access position in which the cabinet is moved outwardly relative to the adjacent cabinets, to provide access to the front of the cabinet. Movement of the cabinet between its retracted, storage position and its extended, access position is typically accomplished by applying a manual pull-out or push-in force to the desired cabinet.

Various arrangements are known to provide movement of the storage cabinets in systems of this type between the extended, access position and the retracted, storage position. Known systems incorporate a cantilever system in which the cabinet is suspended above the floor or other supporting surface as it is moved between its extended and retracted positions. These types of systems are satisfactory for storage areas which are carpeted, since maintaining the storage cabinet above the floor prevents damage to the floor covering when the cabinet is moved between its extended and retracted positions. While systems of this type are operable to move a storage cabinet between an extended and retracted position, they require a significant amount of structural strength and rigidity to support the cabinet in its extended position. Accordingly, the support components and the extension and retraction mechanism entail significant material and component costs.

In some applications, it is not necessary to maintain the storage cabinet off the floor when the cabinet is moved to its extended position, such as in environments where the floor is hard and uncovered, e.g. concrete or heavy duty tile, such as is found in archives, warehouses, storage rooms or other similar spaces. It is often desired to use a large number of extendible and retractable storage cabinets in areas of this type, and accordingly the expense of a cantilever type system is unnecessary since there is no floor covering involved.

It is an object of the present invention to provide a storage assembly which is movable between an extended and retracted position and which is supported on the floor or other supporting surface during such movement so as to eliminate the cost and complexity associated with cantilever-type extension and retraction mechanisms. It is another object of the invention to provide such a system which is relatively simple in its construction and components, and relatively easy to install. Yet another object of the invention is to provide such a system which adapts existing technology in order to simplify the components and cost involved in the manufacture and assembly of the system. A still further object of the invention is to provide such as a system which is capable of accommodating unevenness in the floor or other supporting surface as the cabinet is moved between its extended and retracted positions. Yet another object of the invention is to provide such a system which incorporates a unique and simple arrangement for mounting a storage cabinet to an extendible and retractable base. Yet another object of the invention is to provide such a system in which the storage cabinet is releasably retained in either the extended or retracted position so as to prevent inadvertent movement of the cabinet.

In accordance with one aspect of the invention, a storage assembly adapted for movement relative to a supporting surface between first and second positions includes a storage member and a guide assembly for guiding movement of the storage member between the first and second positions. The storage member includes a base at its lower end, and the base has a set of rotatable wheels for engagement with the supporting surface to provide movement of the storage member thereon. The guide assembly includes a mounting member adapted to be secured to the supporting surface, and an extendible and retractable guide mechanism interposed between the mounting member and the storage member base for guiding movement of the storage member. The storage member is preferably in the form of a cabinet releasably engaged with the base. The base preferably includes an upper wall and a pair of dependent side walls extending downwardly from the upper wall. The upper wall and side walls define an interior, and the set of rotatable wheels are in the form of at least one pair of spaced wheels, with each wheel being rotatably mounted to wheel mounting structure which is secured to an underside defined by the top wall of the base and located within the interior of the base. The extendible and retractable guide mechanism is preferably in the form of a telescoping slide arrangement interposed between the mounting member and the base. A mounting rail is secured to the mounting member and is engageable with the supporting surface, and the telescoping slide arrangement is preferably mounted to the mounting rail. The storage member and the base extend along a horizontal longitudinal axis, and the guide assembly is constructed and arranged to provide movement of the storage member and the base along the horizontal longitudinal axis of the storage member. The storage member is preferably in the form of a cabinet which opens in a direction transverse to its longitudinal axis. In this manner, the cabinet can be pulled out on the supporting surface to an extended position in which the front of the cabinet is accessible, and can then be pushed back to a storage position between a pair of adjacent cabinets when access to the cabinet is no longer required.

In accordance with another aspect of the invention, a storage member having a base located at its lower end is interconnected with a guide assembly for guiding movement of the storage member between first and second positions. The guide assembly includes an inner mounting member adapted to be secured to the supporting surface, and an axially telescoping slide assembly interposed between the inner mounting member and the storage member base. The telescoping slide assembly includes a fixed-position guide member mounted to and extending from the mounting member, and axially movable extension member interconnected with the guide member and the storage member base. The guide member and the extension member are operable to guide movement of the storage member between the first and second positions. The base preferably includes a set of rotatable wheels for engagement with the supporting surface to provide movement of the storage member between the first and second positions. The base is interconnected with the extension member by means of engagement structure interposed between the base and the extension member.

In accordance with yet another aspect of the invention, a storage assembly for movement on a supporting surface between first and second positions includes a storage member and a guide arrangement interconnected with the supporting surface. The storage member includes a base having a movable supporting arrangement engaged with the supporting surface for movably supporting the base on the supporting surface. Engagement structure is interposed between the base and the guide arrangement, and the engagement structure is constructed and arranged to accommodate relative vertical movement between the base and the guide arrangement as the base is moved between the first and second positions. The guide arrangement is preferably in the form of a fixed-position guide member interconnected with the supporting surface and an axially movable extension member interconnected with the fixed-position guide member and with the storage member base. The engagement structure is interconnected between the base and the extension member, and is preferably in the form of an opening associated with the base and an engagement member mounted to the extension member and extending into the opening. With this construction, the engagement member is vertically movable within the opening to accommodate relative vertical movement between the guide arrangement and the base, as the storage member and base are moved between the first and second positions. The opening is preferably formed in a horizontal wall associated with the base, and the engagement member may be in the form of an upstanding cylindrical member adapted for removable mounting to the extension member, and which is received within the opening.

Another aspect of the invention contemplates a system for removably mounting an article of furniture to a movable base. The article of furniture may be in the form of a storage member, which defines a lower end including a pair of spaced surfaces. A locking slot is associated with the base, and defines a laterally facing entrance. The locking slot is located between the pair of spaced surfaces of the storage member, and a locking member is releasably engageable within the locking slot. The locking member defines a pair of spaced engagement surfaces located one on either side of the locking slot, and each engagement surface is adapted to overlie one of the spaced surfaces of the storage member. The locking slot is configured such that movement of the locking member into the locking slot inwardly of the entrance is operable to move the engagement surfaces of the locking member into contact with the spaced surfaces of the storage member to maintain engagement of the storage member with the base. The pair of spaced surfaces of the storage member are preferably defined by a pair of spaced horizontal frame members forming a part of the structure of the storage member, and the base preferably includes an upper support surface for supporting the storage member thereabove. The pair of spaced horizontal fame members are located adjacent the upper support surface of the movable base. The base is preferably movable by means of at least of one set of laterally spaced wheels. Each wheel is rotatably mounted to wheel mounting structure interconnected with the upper support surface of the base, and located beneath one of the spaced horizontal frame members of the storage member. In this manner, the weight of the storage member is transferred directly through the wheel mounting structure to the wheels. The locking member is preferably in the form of an elongated rod defining a pair of spaced ends. Each end of the locking rod overlies one of the spaced horizontal frame members of the storage member. The locking slot is defined by a mounting member interconnected with the upper support surface of the base, and at least an upper portion of the laterally facing entrance of the locking slot is located vertically above the pair of spaced surfaces defined by the pair of spaced horizontal frame members of the storage member. The locking slot is configured such that movement of the elongated rod laterally into the locking slot moves the spaced ends of the elongated rod downwardly against the spaced surfaces defined by the pair of spaced horizontal frame members, so as to clamp the frame members, and thereby the storage member, to the base. The upper portion of the locking slot is preferably defined by a downwardly angled engagement surface which extends inwardly from the slot entrance, and the slot further includes a detent surface located inwardly of the downwardly angled engagement surface for engaging the elongated rod and retaining the elongated rod within the slot, in a position wherein the spaced ends of the elongated rod engage the spaced surfaces defined by the pair of spaced horizontal frame members of the storage member.

In accordance with a still further aspect of the invention, a storage assembly movable relative to a supporting surface between first and second positions includes a storage member having a base located toward its lower end, and a guide assembly for guiding movement of the storage member between the first and second positions. The base includes a movable supporting arrangement engaged with the supporting surface for supporting the storage member on the supporting surface. The guide assembly includes a mounting member adapted to be secured to the supporting surface, and a guide member secured to and extending from the mounting member and interconnected with the base. A retainer mechanism is operable to releasably maintain the storage member in at least the first position. The retainer mechanism is in the form of a catch member mounted to one of the base and the guide assembly, and a movable retainer member mounted to the other of the base and the guide assembly. The catch member includes an engagement surface with which the movable retainer member is engageable, to maintain the storage member in the first position. The retainer member is movable out of engagement with the engagement surface upon application of an axial force to the storage member tending to move the storage member from its first position toward its second position, to enable movement of the storage member to its second position. Return movement of the storage member toward its first position results in subsequent engagement of the retainer member with the engagement surface to releasably retain the storage member in its first position. The base includes a set of rotatable wheels for engagement with the supporting surface to provide movement of the storage member thereon between the first and second positions. The catch member includes a ramped surface extending from the engagement surface, and the movable retainer member is engageable with the ramped surface for guiding the movable retainer member into engagement with the engagement surface as the storage member is moved toward its first position. The movable retainer member is preferably mounted to a housing for movement between an outward position and an inward position, and a biasing element is interposed between the housing and the retainer member for biasing the retainer member toward its outward position. Movement of the storage member toward the first position causes engagement of the retainer member with the ramped surface, to move the retainer member toward its inward position against the force of the biasing element. Movement of the retainer member past the engagement surface, as the storage member is moved to its first position, results in movement of the retainer member toward its outward position under the influence of the biasing element, to engage the retainer member with the engagement surface. The catch member is preferably mounted to the mounting member of the guide assembly, and the movable retainer member and housing are preferably mounted to a lower wall defined by the base which overlies at least a portion of the mounting member when the storage member is in its first position. A resilient bumper is preferably interposed between the mounting member and the base for cushioning impact between the mounting member and the base when the storage member is moved to its first position.

In accordance with a still further aspect of the invention, a shim system is adapted for use in combination with an article of furniture and a support, such as a movable base, for adjusting the elevation of the article of furniture relative to the support. The shim system includes at least one upper shim member and at least one lower shim member mounted to the support. The upper shim member is mounted in a fixed position to the support and the lower shim member is movably mounted to and between the support and the upper shim member. A pair of spaced connectors extend between and interconnect the support with the upper shim member for fixing the upper shim member relative to the support. The lower shim member includes a movable mounting arrangement for providing movement of the lower shim member between an extended, shimming position and a retracted or withdrawn position. In the shimming position, the lower shim member is interposed between the article of furniture and the support for raising the elevation of the article of furniture relative to the support. In the withdrawn position, the lower shim member is withdrawn from between the article of furniture and the support to provide direct engagement therebetween. The lower shim member includes slot structure through which the pair of spaced connectors extend, to enable movement of the lower shim member relative to the support and relative to the upper shim member. The upper shim member includes a transverse slot and the lower shim member includes an opening in alignment therewith, such that the tip of a tool can be inserted through the transverse slot in the upper shim member into engagement with the opening in the lower shim member. Application of a transverse force to the tool enables the lower shim member to be moved laterally relative to the upper shim member, and the slot in the upper shim member accommodates transverse movement of the tip of the tool. In this manner, the lower shim member can be moved laterally outwardly relative to the upper shim member and the support while the connectors are in place and while maintaining the position of the upper shim member relative to the support. In a preferred form, the shim arrangement includes a pair of upper shim members and a pair of lower shim members, with each of the lower shim members being separately laterally movable relative to the support and the upper shim members for providing two different adjustments in the elevation of the article of furniture relative to the support. The upper shim members function to cooperate with a portion of the article of furniture to locate the article of furniture on the support.

The various aspects of the invention, as summarized above, can be incorporated individually or in various combinations into a movable storage assembly. In a preferred form, however, the various aspects are combined together to provide a floor-supported movable storage assembly which is simple in its components, construction and installation, and yet which provides highly satisfactory operation in movement of the storage member between its extended and retracted positions.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 3 is a partial section view taken along line 3—3 of FIG. 1;

FIG. 4 is a partial section view taken along line 4—4 of FIG. 2;

FIG. 5 is a partial section view taken along line 5—5 of FIG. 3;

FIG. 6 is a partial section view taken along line 6—6 of FIG. 5, showing the bottom structure of the storage member as engaged with the base;

FIG. 7 is a view somewhat similar to that of FIG. 6, showing the bottom of the storage member disassembled from the base;

FIG. 8 is a partial section view taken along line 8—8 of FIG. 5;

FIG. 9 is a view similar to FIG. 8, showing vertical movement of the engagement structure relative to the extension member of the slide mechanism for accommodating variations in the face of the floor; and FIG. 10 is a view taken along line 10—10 of FIG. 8;

FIG. 11 is an enlarged partial section view of the area defined by line 11—11 of FIG. 3, showing the retainer mechanism for maintaining the storage assembly in its retracted position;

FIG. 12 is an enlarged partial section view of the area defined by line 12—12 of FIG. 4, showing a retainer arrangement for maintaining the storage member in its extended position;

FIG. 13 is an enlarged partial section view of the area defined by line 13—13 of FIG. 11;

FIG. 14 is a partial section view taken along line 14—14 of FIG. 11;

DETAILED DESCRIPTION OF THE INVENTION

Figure 1:
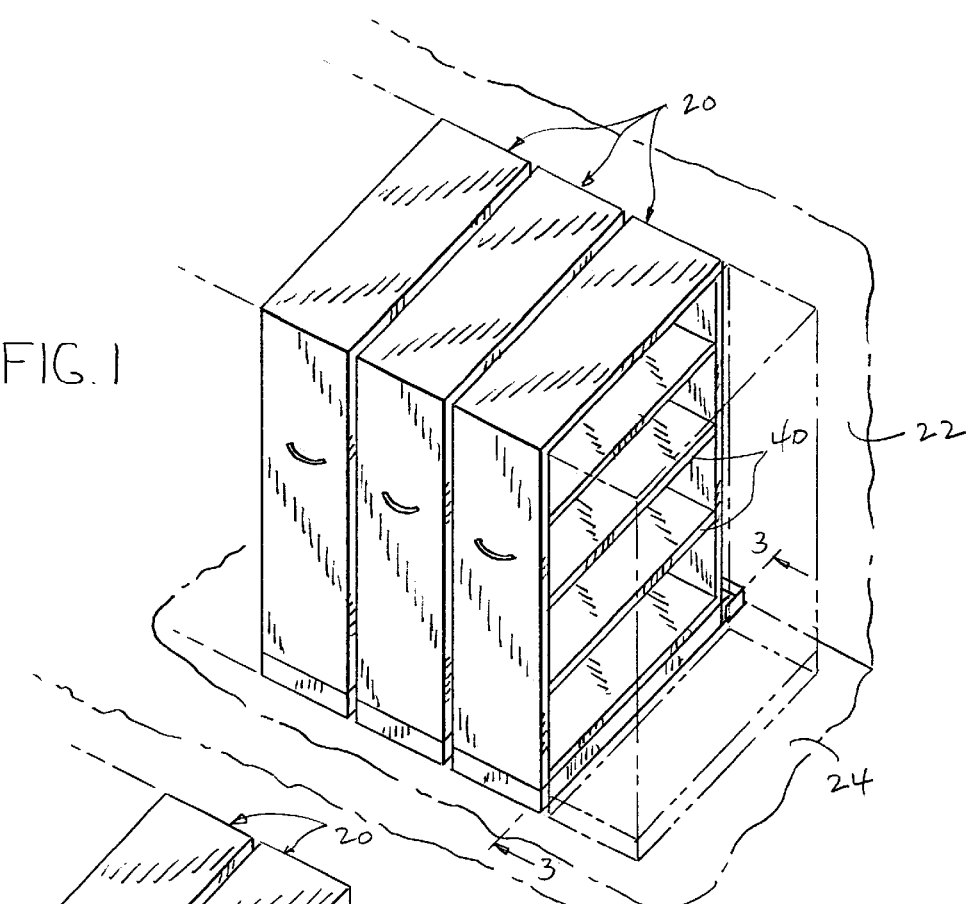
FIG. 1 is a partial isometric view showing a series of movable storage assemblies constructed according to the invention as installed, with all of the storage assemblies in a retracted, storage position.

FIG. 1 illustrates a series of storage units or assemblies 20 mounted adjacent a wall 22 and supported by a floor or other supporting surface 24. In FIG. 1, each storage assembly 20 is shown in a retracted position, in which a side of each storage assembly 20 is located adjacent wall 22. Storage assemblies 20 are located immediately adjacent each other, and are typically installed in a row of numerous similarly constructed storage assemblies 20, to provide high density storage along wall 22.

Figure 2:
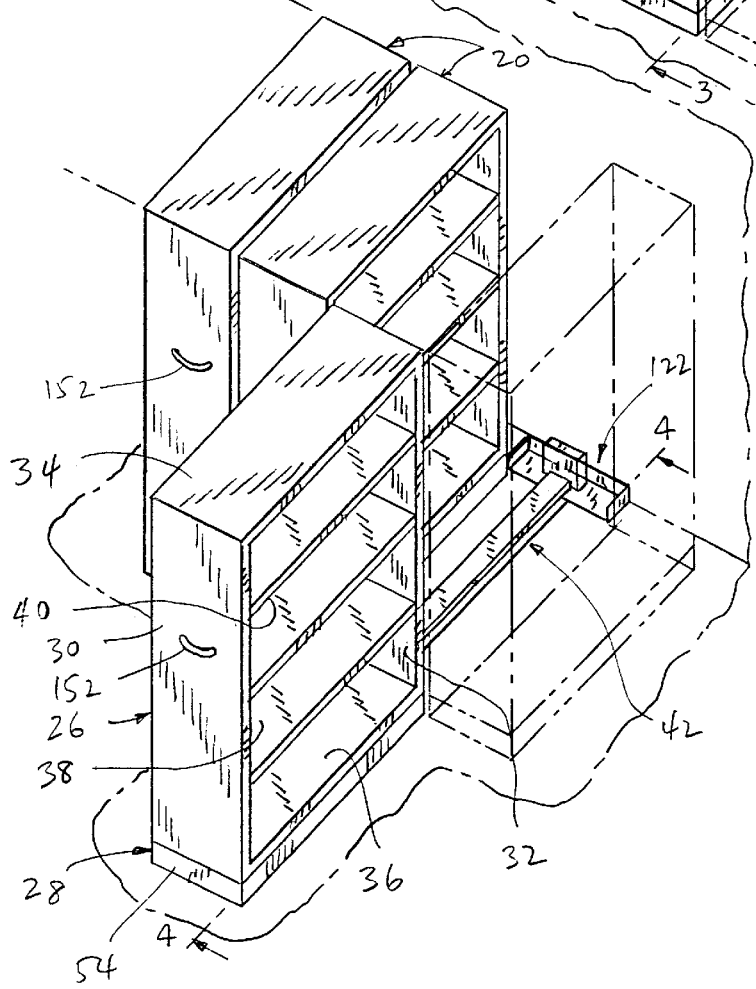
FIG. 2 is a view similar to FIG. 1, showing one of the storage assemblies moved outwardly to an extended, access position for providing access to the storage area of the storage member.

Each storage assembly 20 is movable between a retracted position and an extended position. Storage assemblies 20 of FIG. 1 are shown in the retracted position, and the endmost one of storage assemblies 20 in FIG. 2 is illustrated as being moved to its extended position.

Each storage assembly 20 is in the form of a storage cabinet 26 mounted to a base 28, in a manner to be explained. Storage cabinet 26 is of conventional construction, including a pair of spaced sides 30, 32, a top 34, and a bottom 36 which cooperate to define an internal storage space 38 which may be subdivided using a series of shelves 40. Storage cabinet 26 has an open front which provides access to internal storage space 38, and is preferably closed at its rear. When one of storage cabinets 26 is in its extended position as shown in FIG. 2, internal storage space 38 is fully exposed so as to provide access to items stored on shelves 40. When retracted, storage cabinets 26 are located immediately adjacent each other without aisles therebetween, such that the front of each storage cabinet 26 can only be accessed by moving the storage cabinet 26 to its extended position.

While each storage assembly 20 is illustrated as including an open front storage cabinet 26, it is understood that other types of storage members, such as file cabinets or storage cabinets with doors, may be incorporated into storage assembly 20.

Each storage cabinet 26 extends along a longitudinal axis, along which the storage cabinet 26 is movable between its extended and retracted positions, in a manner to be explained. The open front of each storage cabinet 26 opens in a direction transverse to the longitudinal axis.

FIGS. 3–5 illustrate base 28 and an extendible and retractable guide assembly 42 which interacts with base 28 to guide movement of storage cabinet 26 between its extended and retracted positions.

Figure 15:
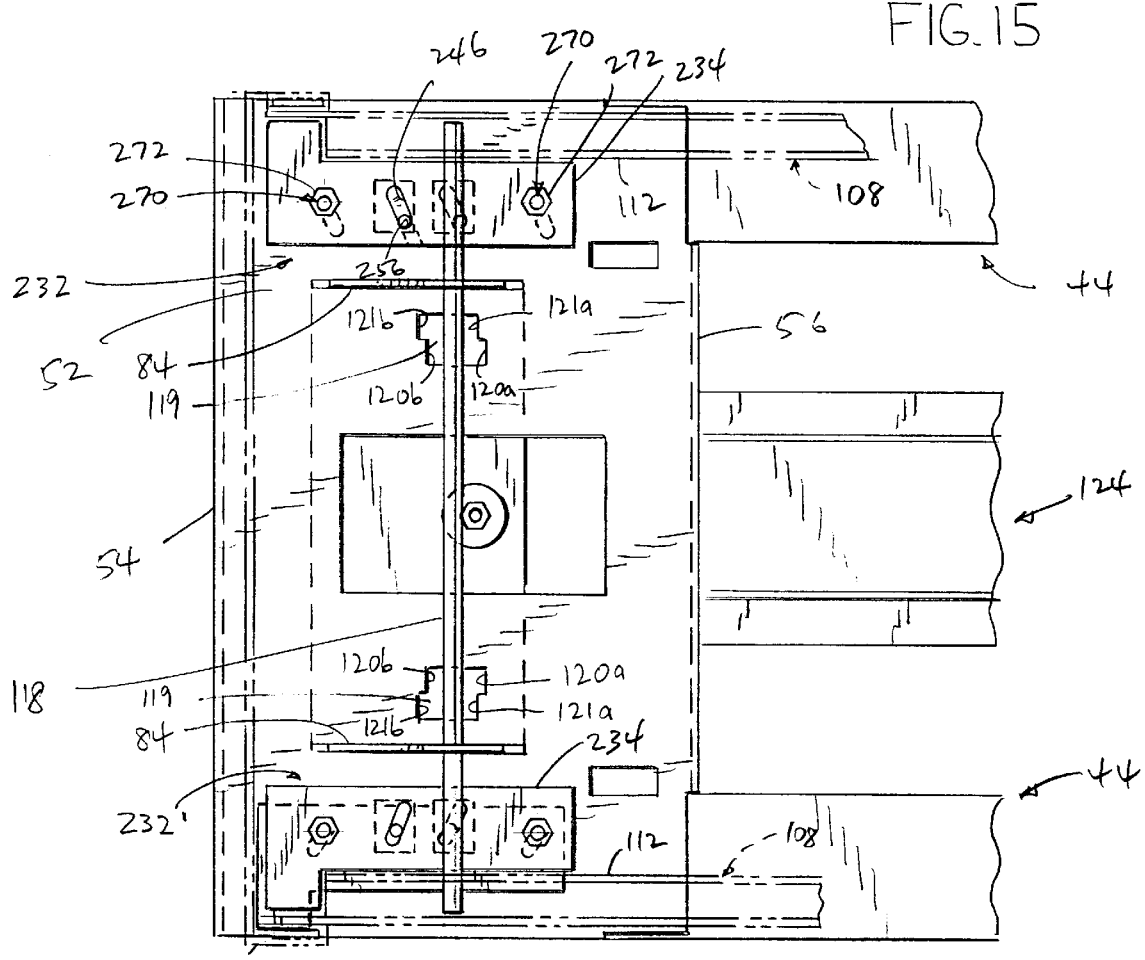
FIG. 15 is a partial top plan view showing an end section of the base and a shim arrangement for altering the elevation of the storage member relative to the base.

As shown in FIGS. 3–5, base 28 includes a pair of wheel-mounting channel members 44, each of which includes an inner wall 46, and outer wall 48 and a top wall 50 extending between and interconnecting the upper ends of inner and outer walls 46, 48, respectively. Channel members 44 extend throughout the length of base 28, and are interconnected at their ends via a pair of transverse upper plate members 52, which overlie top wall 50. Each upper plate member 52 is bent downwardly at its outer end outwardly of the ends of channel members 44, to form an outer wall 54, and is bent downwardly at its inner end between the facing inner surfaces of channel members 44 to form a lip 56 (FIG. 15). Upper plate members 52 are interconnected with channel members 44 in a manner to be explained.

A series of wheel assemblies 58 are mounted to each channel member 44. As shown in FIG. 3, an inner wheel assembly 60 is located adjacent the inner end of each channel member 44, an outer wheel assembly 58 is located adjacent the outer end of each channel member 44, and an intermediate wheel assembly 58 may be located substantially at the center of each channel member 44. Each wheel assembly 58 includes a wheel member 60 mounted to an axle assembly 62, which is in the form of a threaded stud having a shank which extends through an opening in the center of wheel member 60, with a bearing being interposed between the shank and the wheel in a manner as is known. Stud 62 defines a head 64 at one end and a nut 66 is engaged with threads defined by the shank of stud 62 opposite head 64. Axle assembly 62 is mounted to and extends between inner and outer walls 46, 48, respectively, of channel member 44. The lower end of outer wall 48 is located closely adjacent floor 24, to enclose the interior of base 28.

A mounting and engagement channel 70 is mounted to each upper plate member 52. Channel 70 includes a bottom wall 72 and a pair of side walls 74 which extend upwardly from the outer ends of bottom wall 72. Each side wall 74 defines an upper end in the form of a mounting tab 84, which extends through a slot 86 formed in upper plate member 52, and is welded to the upper surface of upper plate member 52 where mounting tab 84 protrudes from slot 86. In this manner, mounting and engagement channel 70 is rigidly secured to upper plate member 52. Mounting and engagement channel 70 is oriented such that its side walls 74 are spaced inwardly from the inner wall 46 of each wheel-mounting channel member 44, and such that its bottom wall 72 is spaced above floor 24.

FIGS. 5–7 show the manner in which mounting tabs 84 are utilized to secure storage cabinet 26 to base 28. As shown in FIG. 7, each mounting tab 84 includes a slot 88 extending inwardly from one of its side edges, such as 90. Slot 88 has a laterally opening entrance 92, and is defined by a downwardly angled upper edge 94 which angles downwardly and inwardly from entrance 92, in combination with a straight bottom edge 96. An end edge 98 extends upwardly from the inner end bottom edge 96, and an arcuate detent edge 100 extends between end edge 98 and upper edge 94. The intersection of arcuate detent edge 100 and upper edge 94 defines a point of intersection 102.

Referring to FIG. 5, storage cabinet 26 includes a pair of corner posts, shown generally at 104, 106 between which an end wall 107 extends. A pair of facing, lower frame members 108 form a part of the structure of cabinet 26, and are interconnected with corner posts 104, 106 toward the lower ends of posts 104, 106. Lower frame members 108 face in opposite directions, and each includes an outer leg 110 and an inner leg 112, with a bight 114 extending between the lower ends of outer and inner legs 112, 114 respectively. The lower downwardly facing surface of bight 114 is spaced slightly above the lower ends of corner posts 104, 106.

Storage cabinet 26 is placed on base 28 such that mounting tabs 84 are located between storage cabinet lower frame members 108 and each post 104, 106 is located directly over one of wheel assemblies 58. In this manner, the weight of storage cabinet 26 is transferred directly to floor 24 through wheel assembly 58. A locking rod 118 is engaged with mounting tabs 84 and lower frame members 108 for releasably mounting storage cabinet 26 to base 28.

FIG. 6 illustrates storage cabinet 26 placed on base 28 such that the bight 114 of lower frame member 108 is spaced slightly above the upper surface of each upper plate member 52 when the lower ends of posts 104, 106 engage upper plate member 52. Slot 88 and base mounting tabs 84 are positioned such that, when storage cabinet 26 is engaged with base 28 in this manner, the upper edge of inner leg 112 of each frame member 108 is in alignment with the lower area of slot entrance 92 and is located above bottom edge 96 of slot 88. Locking rod 118 is then positioned between lower frame members 108 such that each end of locking rod 118 overlies and engages one of inner legs 112. Locking rod 118 has a length slightly less than the spacing between the facing surfaces of lower frame member outer legs 110, to enable locking rod 118 to be positioned in this manner.

Referring to FIG. 15, each upper plate member 52 includes a pair of openings 119, each of which is located adjacent one of mounting tabs 84. Each opening 119 includes an inner pair of spaced engagement edges 120*a*, 120*b* and an outer pair of spaced engagement edges 121*a*, 121*b*. Openings 119 are located under locking rod 118 and are generally in alignment with slots 88 in mounting tabs 84. To engage locking rod 118 with lower frame members 108 to mount storage cabinet 26 to base 28, the user initially places the ends of locking rod 118 on the upper edges of inner legs 112 of lower frame members 108 and moves locking rod 118 toward entrance 92 of slot 88 in each mounting tab 84. The user then engages the tip of an elongated tool, such as a screwdriver, with inner edge 120*a* of each opening 119, and uses the tool as a lever to engage locking rod 118 and to advance locking rod 118 in slot 88. When the range of levering or prying movement of the tool is reached, the user disengages the tool from edge 120*a* and uses edge 121*a* in the same manner to advance locking rod 118 into slot 88 in each mounting tab 84. The user alternates between openings 119, to incrementally advance both sides of locking rod 118 in slot 88 of each mounting tab 84. This inward movement of locking rod 118 in slot 88 results in locking rod 118 riding along downwardly angled upper edge 94 of slot 88. Since the ends of locking rod 118 engage the upper surfaces of flanges 116, this inward movement of locking rod 118 in slots 88 causes a slight downward deflection or bending of locking rod 118 as movement of locking rod 118 in slot 88 continues toward the inner end of slot upper edge 94 as defined by its intersection 102 with detent edge 100. Using edges 121*a* as described, the user continues movement of locking rod 118 past intersection 102, and locking rod 118 is then received within the arcuate recess defined by detent edge 100 inwardly of intersection of 102, as shown in solid lines in FIG. 6. The elevation of detent edge 100 relative to flanges 116 is such that locking rod 118 is slightly deflected downwardly in its center relative to its outer ends which overlie flanges 116, such that a downward clamping force is exerted on lower frame members 108 of storage cabinet 26 toward base 28.

Once locking rod 118 passes intersection 102 upon inward movement into slot 88, locking rod 118 snaps into the recess defined by detent edge 100 and maintains engagement with detent edge 100. To remove locking rod 118 so as to enable cabinet 26 to be removed from base 28, the user reverses the above steps using an elongated tool and edges 120*b*, 121*b*, to disengage locking rod 118 from the recess defined by detent edge 100 and to move locking rod 118 through slot 88 in an outward direction. It can thus be appreciated that provision of mounting tabs 84 with slots 88 formed therein, along with locking rod 118, provides an efficient and convenient method for removably mounting storage cabinet 26 to base 28.

FIGS. 5 and 8–10 illustrate the means by which base 28 is interconnected with guide assembly 42 for guiding movement of base 28 for moving storage cabinet 26 between its extended position of FIG. 2 and its retracted position of FIG. 1. Generally, guide assembly 42 includes an inner mounting member 122 (FIGS. 3, 4) and a mounting rail 124 mounted to and extending outwardly from inner mounting member 122. Mounting rail 124 is in the form of an inverted channel having side walls 128 and a top wall 130 which extends between the upper ends of side walls 128.

A slide mechanism 132 is mounted to mounting rail top wall 130. As shown in FIGS. 4 and 5, slide mechanism 132 includes a guide track 134 which is secured to mounting rail top wall 130, and a telescoping slide member 136 which is movably mounted to guide track 134 and which is interconnected with base 28, in a manner to be explained. Guide track 134 is fixed in position on mounting rail 124, and slide member 136 is preferably in the form of a telescoping extendible and retractable member slidably mounted within track structure defined 25 by guide track 134. Ball bearings are interposed between the components of slide mechanism 132 which are moveable relative to each other, to facilitate extension and retraction of slide member 136 relative to guide track 134. In a preferred form, slide mechanism 132 may be a heavy duty drawer slide such as is available from Schock Metallwerk GmbH, Siemenstrasse 1-3, P.O. Box 1120, D-73565, Urbach, Germany, under its designations 037.07466, 037.07467, 037.07468 and 037.07360, although it is understood that any satisfactory extension and retraction mechanism could be employed.

FIGS. 5 and 8–10 also show interconnection of base 28 with slide mechanism 132. As shown, bottom wall 72 of mounting and engagement channel 70 is located slightly above the top surface of slide member 136. A cylindrical engagement member 138 is interconnected between bottom wall 72 and slide member 136.

Bottom wall 80 defines an opening 140 and engagement member 138 extends through opening 140. Engagement member 138 is in the form of an upstanding cylindrical sleeve 141 interconnected with slide member 136. Sleeve 141 defines a vertical passage and a stud 142, which includes a head 144 and a shank 146, is mounted to slide member 136 such that the lower end of shank 146 extends through an opening formed in an upper wall of slide member 136 and the upper portion of shank 146 extends through the vertical passage in sleeve 141. A washer 148 rests on the top of sleeve 141, and a nut 150 is engaged with the threaded end portion of shank 146 so as to secure sleeve 141, stud 142, washer 148 and nut 150 to slide member 136 as a unit. Opening 140 in lower wall 72 has a diameter less than that of washer 148, so as to provide "floating" vertical movement between engagement member 138 and bottom wall 72 of mounting and engagement channel 70. Washer 148 functions as an upper stop and slide member 136 functions as a lower stop, to control the range of relative movement between engagement member 138 and bottom wall 72. In this manner, engagement member 138 is fixed to slide member 136 so as to be movable therewith relative to guide track 134. Engagement member 138, which extends through opening 140 in bottom wall 72 of mounting and engagement channel 70, functions to interconnect base 28 with slide member 136.

In operation, the user exerts an axial pull-out or push-in force on storage cabinet 26, typically by use of a handle 152 (FIGS. 1,2) mounted to the outer side 30 of storage cabinet 26. This force is transferred to base 28, which causes wheel members 60 to rotate so as to move storage cabinet 26 on floor 24. This movement of base 28 is transferred to slide mechanism 132 by engagement of engagement member 138 with the edges of opening 140 formed in mounting and engagement channel 70, such that slide mechanism 132 extends and retracts in response to the pull-out or push-in movement of storage cabinet 26.

The "floating" interconnection of base 28 with slide mechanism 132, provided by engagement member 138 and opening 140, accommodates relative movement between slide mechanism 132 and base 128 which may occur due to irregularities in the surface of floor 24. For example, as shown in FIG. 9, when wheel 60 of base 28 is moved into a depression, shown at 154, formed in floor 24, bottom wall 72 of mounting and engagement channel 70 moves downwardly relative to engagement member 138, while the outer surfaces of engagement member 138 remain adjacent the edges of opening 140. The total range of vertical movement between slide mechanism 132 and base 28 is defined by the space between the upper surface of slide member 136 and the underside of washer 148, which function to ensure that bottom wall 80 is trapped therebetween to maintain engagement of base 28 with slide mechanism 132.

Referring to FIGS. 3, 11 and 14, inner mounting member 122 defines a bottom plate 158, adapted for engagement with floor 24, and an end wall 160 extending upwardly from the inner end of bottom plate 158. A series of openings 162 are formed in bottom plate 158, and anchor bolts, which are secured to floor 24, extend upwardly through selected ones of openings 162. A nut, such as shown at 163, is engaged with the threaded shank of each anchor bolt, so as to securely mount inner mounting member 122 to floor 24. In a typical application, end wall 160 of inner mounting member 122 is engaged with wall 22, which extends upwardly from floor 24.

The inner end of mounting rail 124 overlies bottom plate 158 and is secured thereto such as by welding. The end of mounting rail 124 abuts the outer surface of a stop plate 164, and is secured thereto such as by welding. A reinforcing plate 165 extends between stop plate 164 and end wall 160, and is secured in place such as by welding. Inner mounting member 122 further includes a pair of side flanges 166, which are preferably formed of upwardly bent end sections of bottom plate 158. A resilient bumper 168 is mounted to stop plate 164 via a bolt 170, which extends through an opening formed in stop plate 164, and a nut 172 is engaged with bolt 170 so as to securely mount bumper 168 to stop plate 164.

In a multiple cabinet installation as shown in FIGS. 1 and 2, a number of inner mounting members 122 are placed side-by-side at the corner defined by wall 22 and floor 24. In such an installation, the side flanges 166 of adjacent inner mounting members 122 are placed in engagement with each other and openings in side flanges 164 are in alignment with each other, such that the shank of a bolt 174 (FIG. 14) is placed through the aligned openings. A nut 176 engages the shank of bolt 174 and, in this manner, adjacent inner mounting members 122 are secured to each other.

Inner mounting member 122 functions to secure the inner end of mounting rail 124 in position on floor 24. As shown in FIG. 12, the outer end of mounting rail 124 is connected to an angle member 177, which includes a horizontal flange secured to floor 24 using conventional anchor bolts. In this manner, both the outer and inner ends of mounting rail 124 are fixed in position on floor 24. Angle member 177 further includes a vertical flange to which a resilient bumper 178 is mounted via a bolt and nut assembly, shown generally at 179.

As shown in FIGS. 3 and 4, a catch member 180 is mounted toward each of the inner and outer ends of mounting rail 124, and catch members 180 are mounted on opposite sides of mounting rail 124. A pair of retainer mechanisms, shown generally at 182 (FIGS. 5 and 11–14), are mounted to base 28 adjacent its inner end. In a manner to be explained, each retainer mechanism 182 is releasably engageable with one of catch members 180 so as to releasably retain storage cabinet 26 in either its extended or retracted position.

Referring to FIGS. 5 and 11–14, each catch member 180 is mounted to one of mounting rail side walls 128 via a pair of fasteners 184 which extend through openings formed in a mounting section 186 of catch member 180. A ramped guide surface 188 is formed at the top of catch member 180, terminating in a groove 190. An upper horizontal rear surface extends from groove 190 in a direction opposite ramped guide surface 188. The innermost catch member 180 is oriented such that its ramped guide surface 188 points away from wall 22, and the outer catch member 180 is oriented in an opposite direction, such that its ramped guide surface 188 points toward wall 22.

Each retainer mechanism 182 includes a cylindrical housing 198 having a threaded side wall 200 and an end wall 202. Housing 198 defines an internal cavity 204, which is closed at its upper end via a threaded plug 206. A retainer button 208 extends outwardly of housing 198 through an opening formed in end wall 202, and a shoulder 210 is defined at the inner end of retainer button 208. Shoulder 210 is received within cavity 204, and is sized so as to engage end wall 202 adjacent the opening through which button 208 extends, such that button 208 is slidably mounted within cavity 204. A spring 212 is disposed within cavity 204, bearing between the top surface of shoulder 210 and the bottom of plug 206, for biasing button 208 outwardly toward a position in which shoulder 210 engages end wall 202, as shown in solid lines in FIG. 13.

An opening 214 is formed in a retainer mounting tab 215 which extends inwardly from the inner end wall of base 28. The upper end of housing sidewall 200 includes external threads which engage internal threads formed in a sleeve 216 which extends through an opening in mounting tab 215. Sleeve 216 defines an upper flange 217 which overlies mounting tab 215 and is welded thereto. Housing 198 can be turned relative to sleeve 216 to adjust its vertical position. A threaded nut 218 is engaged with the external threads of housing 198, and is turned down to engage the upper surface of sleeve flange 217 to lock the vertical position of housing 198 relative to sleeve 216. Retainer mechanism 182 is positioned such that, when button 208 is in its extended position as shown in FIG. 13, the lower end of button 208 extends vertically below the intersection of guide surface 188 with groove 190.

In operation, each retainer mechanism 182 interacts with catch members 180 as follows to releasably retain storage cabinet 26 in either its extended position or its retracted position. When storage cabinet 26 is in its retracted position as shown in FIG. 11, button 208 is engaged within groove 190 in inner catch member 180. When an outward axial pulling force is exerted on storage cabinet 26 tending to move storage cabinet 26 away from its retracted position, button 208 engages the angled front wall of groove 190, which resists outward movement of cabinet 26. When a sufficient outward force is exerted on storage cabinet 26 to exceed a threshold, the front wall of groove 190 functions to move button 208 upwardly within housing cavity 204, against the force of spring 212, such that the lower end of button 208 clears the intersection of guide surface 188 with groove 190 and button 208 is dislodged from groove 190. The lower end of button 208 then rides on guide surface 188 as outward movement of storage cabinet 26 continues.

As storage cabinet 26 approaches its fully extended position of FIGS. 2 and 12, button 208 comes into contact with guide surface 188 of the outer catch member 180, and rides on guide surface 188 toward groove 190. Guide surface 188 forces button 208 upwardly against the force of spring 212. As storage cabinet 26 reaches its extended position, button 208 passes into groove 190 and returns to it extended position as shown in FIG. 13. Referring to FIG. 12, a vertical stop finger 224 extends downwardly from bottom wall 72 of mounting and engagement channel 70, and engages resilient bumper 178 as storage cabinet 28 reaches its extended position. Bumper 178 acts as a cushion between base 28 and mounting rail 124. If the momentum of base 28 and storage cabinet 26 is sufficient, bumper 178 will compress an amount sufficient to enable button 208 to disengage groove 190 and pass onto rear surface 196. Bumper 178 resists such compression and tends to return to its original configuration, to move base 28 and cabinet 26 inwardly and to seat button 208 within groove 190, to releasably retain base 28 and storage cabinet 26 in its extended position. When it is desired to return storage cabinet 26 to its retracted position, an inward pushing force is exerted on storage cabinet 26 which results in engagement of button 208 with the front wall of groove 190. When the inward pushing force exceeds a threshold, button 208 is moved upwardly by the wall of groove 190 against the force of spring 212 and is dislodged from groove 190 defined by the outer catch member 180. This insures that a push-in force exceeding a predetermined threshold must be exerted in order to move storage cabinet 26 away from its extended position. As inward movement of storage cabinet 26 continues, button 208 engages guide surface 188 of the innermost catch member 180, which again forces button 208 upwardly into groove 190 as storage cabinet 26 reaches its retracted position. Bumper 168 cushions the impact between base 28 and stop plate 164 when storage cabinet 26 reaches its retracted position. Again, the resiliency of bumper 168 resists compression, and bumper 168 thus urges base 28 to a position in which button 208 is engaged within groove 190, so as to ensure that a pull-out force exceeding a predetermined threshold must be exerted on storage cabinet 26 in order to move storage cabinet 26 away from its retracted position.

Figure 16:
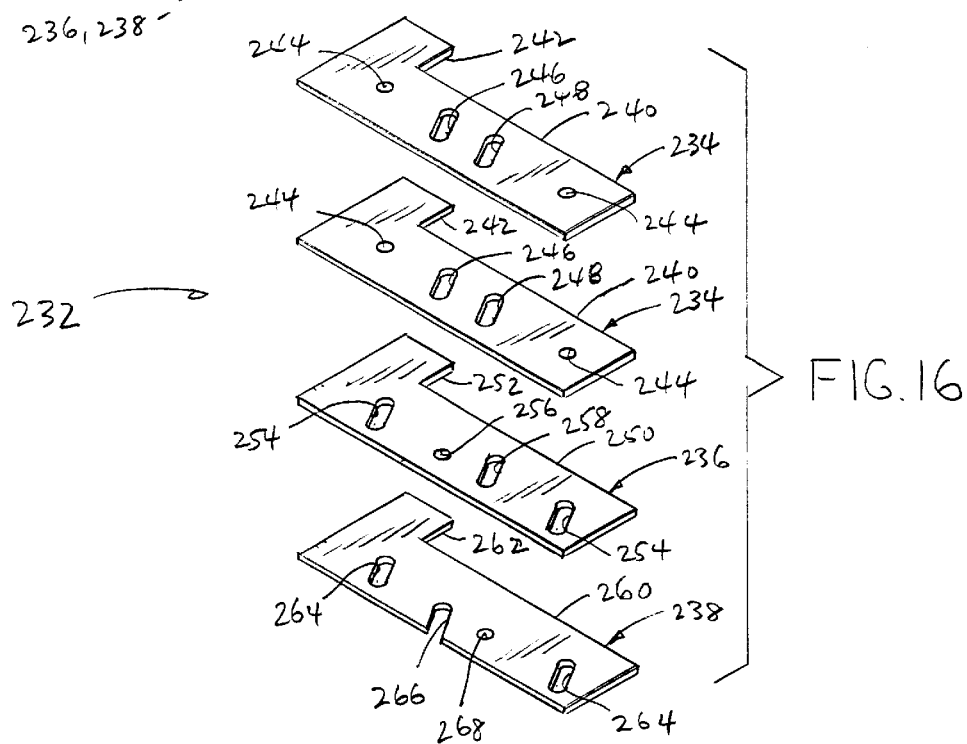
FIG. 16 is an exploded isometric view of the components of the shim arrangement of FIG. 15.

FIGS. 5, 15 and 16 illustrate a shim system, shown generally at 232, which is mounted to the outer one of upper plate members 52 of base 28. Shim system 232 is located in the vicinity where one of the corners of storage cabinet 26 is to be located, and a shim system 232' having mirror image components is mounted toward the opposite end of upper plate member 52 from shim system 232. The following description of shim system 232 applies equally to shim system 232'.

Shim system 232 includes a pair of upper L-shaped locating plates 234, an upper L-shaped shim member 236 and a lower L-shaped shim member 238. Locating plates 234 and upper and lower shim members 236, 238, respectively, have a similar overall configuration and footprint.

Each locating plate 234 includes an axial leg 240 and a transverse leg 242. A pair of mounting apertures 244 are located toward the opposite ends of axial leg 240, and a pair of angled slots 246, 248 are formed in axial leg 240 between mounting apertures 244.

Upper shim member 236 also includes an axial leg 250 and a transverse leg 252. A pair of angled end slots 254 are formed toward the opposite ends of axial leg 250, and are parallel to and in alignment with mounting apertures 244 in locating plates 234. An opening 256 is formed in axial leg 250 in alignment with angled slots 246 of locating plates 234, between end slots 254. An angled intermediate slot 258, which is parallel to end slots 254, is also located between end slots 254 and is in alignment with angled slots 248 of locating plates 234.

Lower shim member 238 also defines an axial leg 260 and a transverse leg 262. A pair of angled end slots 264 are formed toward the opposite ends of axial leg 260, and are parallel to and in alignment with end slots 254 of upper shim member 236. An angled intermediate slot 266 is formed between end slots 264 in parallel relationship thereto, and is in alignment with opening 256 in upper shim member 236 and slots 246 of locating plates 234. An opening 268 is formed between end slots 264, and is located in alignment with slot 258 of upper shim member 236 and slots 248 of locating plates 234.

A pair of upwardly extending threaded studs 270 extend through aligned openings in top wall 50 of wheel-mounting channel member 44 and upper plate member 52. Each stud 270, which is preferably in the form of a carriage bolt, includes a threaded shank which extends through end slots 254, 264 of upper and lower shim members 236, 238, respectively, and through mounting apertures 244 of locating plates 234. A nut 272 is engaged with the shank of each stud 270. Studs 270 function to mount upper plate member 52 to channel members 44, and to secure shim systems 232 in position relative to upper plate member 52 and channel members 44.

Locating plates 234 and upper and lower shim members 236, 238, respectively, are initially engaged with upper plate member 52 in an aligned, stacked configuration. Transverse legs 242, 252 and 262 are configured to define a corner at which a corner of cabinet 26 is to be located when placed on base 28. If the side-to-side elevation of cabinet 26 is satisfactory, locating plates 234 and upper and lower shim members 236, 238, respectively, are left as is, and simply function to locate the corner of storage cabinet 26.

If it is desired to raise the elevation of the corner of cabinet 26, the user slightly loosens nuts 272 to enable lower shim member 238 and upper shim member 236 to be slid transversely relative to locating plates 234. To accomplish this, the user inserts the tip of a tool such as a screwdriver through angled slots 248 of locating plates 234 and through angled slot 258 of upper shim member 236, into engagement with opening 268 of lower shim member 260. The user exerts a transverse force on the tool, which is applied to lower shim member 238 and which functions to move lower shim member 238 laterally outwardly relatively to locating plates 234 and upper shim member 236. Slots 248 and 258 accommodate movement of the tool as lower shim member 238 is moved outwardly, and angled end slots 264 of lower shim member 238 provide movement of lower shim member 238 relative to studs 270. This lateral outward movement of lower shim member 238 places the outer edges of axial leg 260 and transverse leg 262 under the corner of cabinet 26, such that the lower end of cabinet post 106 rests on lower shim member 238. If lower shim member 238 provides the desired adjustment in the vertical position of the corner of cabinet 26, nuts 272 are tightened so as to secure lower shim member 238 and upper shim member 236 in position. Locating plates 234 and upper shim member 236 remain in a constant position relative to upper plate member 52, to locate the inside corner of storage cabinet 26.

If additional elevation is required, the user loosens nuts 272 while lower shim member 238 remains in its extended position. The user then inserts the tool tip through angled intermediate slots 246 of locating plates 234 into engagement with opening 256 of upper shim member 236. Slot 266 in lower shim member 238 functions to receive any portion of the tool tip which protrudes below upper shim member 236. The user then exerts a lateral force on the tool, which is applied to upper shim member 236 at opening 256, to move upper shim member 236 laterally relative to locating plates 234. Slots 254 in upper shim member 236 enable such lateral sliding movement of upper shim member 236, such that upper shim member 236 can be moved outwardly over lower shim member 238. FIG. 5 illustrates upper shim member 236 and lower shim member 238 moved outwardly in this manner, such that upper and lower shim members 236, 238, respectively, are positioned below the corner of cabinet 26, to raise one side or the other of cabinet 26 to a desired elevation. Once upper and lower shim members 236, 238 are positioned as desired, the user tightens each nut 272 onto the threaded shank of stud 70, to clamp shim system 232 in position.

When both upper and lower shim members 236, 238, respectively, are moved outwardly, locating plates 234 remain in position on upper plate member 52 of base 28, to locate the corner of storage cabinet 26. It can thus be appreciated that shim system 232 serves the dual purpose of locating the corners of storage cabinet 26 on base 28, as well as providing selective adjustment in the elevation of storage cabinet 26 relative to base 28.

It should be understood that shim system 232 may incorporate any number of movable shim members and locating plates as desired, and is not limited to the exact numbers and configurations shown and described.

As noted above, shim systems 232, 232' are provided on the outer one of upper plate members 52 of base 28. If necessary, shim systems such as 232, 232' may also be located at the inner one of upper plate members 52 to provide the side-to-side shimming capability for the inner end of storage cabinets 26. Alternatively, locating plates 234 may be mounted to the inner one of upper plate members 52, without shim members 236, 238, to locate the inner corners of storage cabinet 26 on base 28.

As noted previously, locking rod 118 flexes when engaged within slot 88 so as to securely clamp storage cabinet 26 onto base 28. The flexibility of locking rod 118 is sufficient to accommodate use of one or both of upper and lower shim members 236, 238 when positioned between storage cabinet 26 and base 28.

It can thus be appreciated that storage assembly 20 provides a simple and efficient construction for a floor-supported extendible and retractable storage cabinet. The storage cabinet is adapted for mounting to a compact and efficiently arranged wheeled base via a mounting arrangement providing quick and easy mounting of the storage cabinet to the base using a minimal number of tools. The guide mechanism, which guides movement of the base so as to move the storage cabinet between its extended and retracted positions, adapts existing drawer slide technology in a floor-mounted application so as to guide movement of the base. A unique floating engagement structure is interposed between the guide assembly and the base for accommodating unevenness in the floor and for minimizing stress on the guide components as the base is moved between its extended and retracted positions. A relatively simple and effective retainer mechanism ensures that the storage cabinet is releasably retained in either its extended or retracted position so as to prevent inadvertent movement of the storage cabinet away from either position. A simple and easily operated shim system functions to both locate the cabinet on the base and to adjust the elevation of the cabinet relative to the base.

Various alternatives and embodiments are contemplated as being within the scope of the following claims particularly pointing out and distinctly claiming the subject matter regarded as the invention.

I claim:

1. A storage assembly adapted for movement relative to a supporting surface between first and second positions, comprising:

a storage member including a pair of spaced surfaces located toward a lower end defined by the storage member;

a base including a set of rotatable wheels adapted for engagement with the supporting surface to provide movement of the storage member thereon;

a removable mounting arrangement interposed between the base and the storage member, comprising a locking slot associated with the base and defining a laterally facing entrance, wherein the locking slot is located between the pair of spaced surfaces defined by the storage member; and a locking member releasably engageable within the locking slot and defining a pair of spaced engagement surfaces located one on either side of the locking slot, wherein each engagement surface is adapted to overlie one of the spaced surfaces of the storage member; wherein the locking slot is configured such that movement of the locking member in the locking slot inwardly of the entrance is operable to move the engagement surfaces of the locking member into contact with the spaced surfaces of the storage member to maintain engagement of the storage member with the base;

a guide assembly for guiding movement of the storage member between the first and second positions, wherein the guide assembly includes an inner mounting member adapted to be secured to the supporting surface; and an axially telescoping slide assembly interposed between the inner mounting member and the base, including a fixed-position guide member mounted to and extending from the mounting member, and an axially movable extension member interconnected with the guide member and the base, wherein the guide member and the extension member are operable to guide movement of the storage member between the first and second positions;

an engagement structure interposed between the base and the extension member, wherein the engagement structure is constructed and arranged to accommodate relative vertical movement between the base and the extension member as the storage member is moved between the first and second positions;

a retainer mechanism for releasably maintaining the storage member in the first position, comprising a catch member mounted to one of the base and the inner mounting member, and a movable retainer member mounted to the other of the base and the inner mounting member, wherein the catch member includes an engagement surface with which the movable retainer member is engageable to maintain the storage member in its first position, wherein the retainer member is movable out of engagement with the engagement surface upon application of an axial force to the storage member tending to move the storage member from its first position toward its second position to enable movement of the storage member to its second position, and wherein return movement of the storage member to the first position results in subsequent engagement of the retainer member with the engagement surface to releasably retain the storage member in the first position; and a shim system for altering the elevation of the storage member relative to the base, comprising two or more shim members mounted to the base via a mounting arrangement providing fixed-position mounting of a first one of the shim members relative to the base and movable mounting of a second one of the shim members relative to the first shim member and relative to the base, wherein the second shim member is located between the first shim member and the base and is movable between a shimming position in which the second shim member is positioned between the storage member and the base, and a withdrawn position in which the second shim member is withdrawn from between the storage cabinet and the base to provide direct engagement of the storage cabinet with the base.

2. A storage assembly adapted for movement relative to a supporting surface between first and second positions, comprising:

a storage member having a base located at its lower end, wherein the base includes a set of rotatable wheels adapted for engagement with the supporting surface and adapted to provide movement of the storage member thereon; and a guide assembly for guiding movement of the storage member between the first and second positions, comprising a mounting member adapted to be secured to the supporting surface, and an extendible and retractable guide mechanism interposed between the mounting member and the storage member for guiding movement of the storage member between its first and second positions, wherein the extendible and retractable guide mechanism comprises a telescoping slide arrangement including a stationary guide member interconnected with the mounting member, and an extendible and retractable slide member interconnected with the base and slidably mounted to the stationary guide member.

3. The storage assembly of claim 2, wherein the storage member and base extend along a horizontal longitudinal axis, and wherein the storage member defines an internal storage area which opens in a direction transverse to the longitudinal axis, wherein the guide assembly is constructed and arranged to provide movement of the storage member and base along the horizontal longitudinal axis between the first and second positions.

4. The storage assembly of claim 3, wherein the storage member comprises a cabinet releasably engaged with the base.

5. A storage assembly adapted for movement relative to a supporting surface between first and second positions, comprising:

a cabinet having a base located at its lower end, wherein the base includes a set of rotatable wheels adapted for engagement with the supporting surface to provide movement of the cabinet thereon, wherein the cabinet and base extend along a horizontal longitudinal axis, and wherein the cabinet defines an internal storage area which opens in a direction transverse to the longitudinal axis, wherein the cabinet defines a lower end releasably engageable with the base and includes a pair of spaced members located at its lower end, and wherein the cabinet is releasably engaged with the base by means of an engagement member which spans between and engages the spaced members of the cabinet, wherein the engagement member is releasably engaged with an engagement structure provided on the base which is operable to force the engagement member against the pair of spaced members of the cabinet; and a guide assembly for guiding movement of the cabinet between the first and second positions, comprising a mounting member adapted to be secured to the supporting surface, and an extendible and retractable guide mechanism interposed between the mounting member and the cabinet for guiding movement of the cabinet between its first and second positions, wherein the guide assay is constructed and arranged to provide movement of the cabinet and base along the horizontal longitudinal axis between the first and second positions.

6. The storage assembly of claim 4, wherein the base includes an upper wall and a pair of spaced side walls extending downwardly from the upper wall, wherein the upper wall and side wall define an interior, and wherein the base further includes a pair of spaced wheels, each of which is rotatably mounted to a wheel mounting structure secured to an underside defined by the top wall of the base and located within the interior of the base.

7. The storage assembly of claim 2, further comprising a mounting rail secured to the mounting member and adapted for engagement with the supporting surface, wherein the stationary guide member of the telescoping slide arrangement is mounted to the mounting rail.

8. The storage assembly of claim 7, wherein the cabinet defines a pair of spaced sides, wherein the mounting member is located outwardly of one of the sides of the cabinet, wherein the mounting rail and the telescoping slide arrangement extend from the mounting member beneath the cabinet and terminate in an outer end located inwardly of a second one of the sides of the cabinet.

9. The storage assembly of claim 7, further comprising an engagement structure interposed between the base and the telescoping slide arrangement for causing extension and retraction of the telescoping slide arrangement in response to horizontal movement of the storage member and the base on the supporting surface, and wherein the engagement structure is constructed and arranged to accommodate relative vertical movement between the base and the telescoping slide arrangement as the storage member and base are moved between the first and second positions.

10. The storage assembly of claim 3, further comprising a releasable retainer mechanism interposed between the base and the guide assembly mounting member for releasably retaining the storage member in one of the first and second positions.

11. The storage assembly of claim 10, wherein the releasable retainer mechanism comprises a catch member mounted to one of the base and the mounting member, and a movable retainer member mounted to the other of the base and the mounting member, wherein the catch member includes an engagement surface with which the moveable retainer member is engageable to maintain the storage member in one of the first and second positions, wherein the retainer member is movable out of engagement with the engagement surface upon application of an axial force to the storage member tending to move the storage member from its first position toward its second position to enable movement of the storage member to its second position, wherein return movement of its storage member to its first position results in subsequent engagement of the retainer member with the engagement surface to releasably retain the storage member in the first position.

12. A storage assembly adapted for movement relative to a supporting surface between a first position and a second position, comprising:
   a storage member having a base located at its lower end, wherein the base includes a set of rotatable wheels adapted for engagement with the supporting surface and adapted to provide movement of the storage member thereon between the first and second positions;
   a guide assembly for guiding movement of the storage member during movement between the first and second positions, wherein the guide assembly includes an inner mounting member adapted to be secured to the supporting surface; and
   an axially telescoping slide assembly interposed between the inner mounting member and the storage member base, including a fixed-position guide member mounted to and extending from the mounting member, and an axially movable extension member slidably mounted to the guide member and interconnected with the storage member base, wherein the extension member slidably extendible and retractable relative to the guide member to guide movement of the storage member between the first and second positions.

13. The storage assembly of claim 12, wherein the guide assembly further includes a mounting rail secured to and extending from the inner mounting member and adapted for engagement with the supporting surface, wherein the fixed-position guide member is secured to the mounting rail.

14. The storage assembly of claim 13, wherein the base is interconnected with the axially movable extension member by means of engagement structure interposed between the base and the extension member which is operable to accommodate relative vertical movement between the base and the extension member as the storage member is moved between the first and second positions.

15. The storage assembly of claim 13, wherein the storage member comprises a storage cabinet releasably mounted to the base, and wherein the base includes an upper wall and a pair of depending side walls, wherein the set of rotatable wheels includes at least a pair of wheels located one adjacent each dependent side wall and wherein each wheel is rotatably mounted to wheel mounting structure interconnected with the base upper wall.

16. The storage assembly of claim 15, wherein the mounting rail, the fixed-position guide member and the extension member are located between the pair of wheels.

17. A storage assembly adapted for movement relative to a supporting surface between first and second positions, comprising:
   a storage member including a base having a movable supporting arrangement adapted for engagement with the supporting surface, wherein the movable supporting arrangement is adapted to support the base on the supporting surface and is adapted to provide movement of the base between the first and second positions;
   an extendible and retractable guide arrangement adapted for interconnection with the supporting surface for guiding movement of the base between the first and second positions; and
   an engagement structure interposed between the base and the guide arrangement, wherein the engagement structure is constructed and arranged to accommodate relative vertical movement between the base and the guide arrangement as the base is moved between its first and second positions, wherein the engagement structure includes an engagement member provided on one of the base and the guide arrangement, and an opening provided on the other one of the guide arrangement, wherein the engagement member is vertically movable within the opening so as to maintain engagement of the base with the guide arrangement while accommodating vertical movement therebetween during movement of the base between the first and second positions.

18. The storage assembly of claim 17, wherein the guide arrangement comprises a fixed-position guide member adapted for interconnection with the supporting surface and an axially movable extension member interconnected with the fixed-position guide member and with the storage member base, wherein the engagement structure is interconnected between the base and the extension member.

19. The storage assembly of claim 18, wherein the opening is provided on the base and the engagement member is provided on the extension member and extends into the opening.

20. A storage assembly adapted for movement relative to a supporting surface between first and second positions, comprising:
   a storage member including a base having a movable supporting arrangement adapted for engagement with the supporting surface, wherein the movable supporting arrangement is adapted to support the base on the supporting surface and is adapted to provide movement of the base between the first and second positions;
   a guide arrangement adapted for interconnection with the supporting surface for guiding movement of the base between the first and second positions, wherein the guide arrangement comprises a fixed-position guide member adapted for interconnection with the supporting surface and an axially movable extension member interconnected with the fixed-position guide member and with the storage member base; and
   engagement structure interposed between the base and the guide arrangement, wherein the engagement structure is constructed and arranged to accommodate relative vertical movement between the base and the guide arrangement as the base is moved between its first and second positions, wherein the engagement structure is interconnected between the base and the extension member, wherein the engagement structure composes an opening associated with the base and an engagement member mounted to the extension member and extending into the opening, wherein the engagement member is vertically movable within the opening to accommodate relative vertical movement between the base and the guide arrangement as the base is moved between the first and second positions wherein the opening is formed in a horizontal wall associated with the base, and wherein the engagement member includes a pair of vertical engagement surfaces extending upwardly from the extension member, wherein each upstanding engagement surface is located adjacent an edge of the horizontal wall defining the opening, wherein the engagement member is vertically movable within the opening and wherein engagement of each engagement surface with the adjacent edge of the horizontal wall defining the opening is operable to engage the base with the extension member.

21. The storage assembly of claim 20, wherein the engagement member defines a central mounting section adapted for removable mounting to the extension member, and wherein the pair of vertical engagement surfaces are defined by a pair of end members, each of which is interconnected with and extends upwardly from the central mounting section.

22. A system for removably mounting an article of furniture to a movable base, wherein the article of furniture includes a pair of spaced surfaces located toward a lower end defined by the article of furniture, comprising:
 a locking structure associated with the base and defining a laterally facing entrance, wherein the locking structure is adapted to be located between the pair of spaced surfaces; and
 a locking member releasably engageable within the locking structure and defining a pair of spaced engagement surfaces located one on either side of the locking structure, wherein each engagement surface is adapted to overlie one of the spaced surfaces of the article of furniture, wherein the locking structure is configured such that movement of the locking member into engagement with the locking structure inwardly of the entrance is adapted to move the engagement surfaces of the locking member into contact with the spaced surfaces of the article of furniture to maintain engagement of the article of furniture with the base.

23. The removable mounting system of claim 22, wherein the article of furniture comprises a storage member and wherein the pair of spaced surfaces located toward a lower end defined by the storage member are defined by a pair of spaced horizontal frame members forming a part of the storage member.

24. The removable mounting system of claim 23, wherein the movable base includes an upper support surface for supporting the storage member thereabove, wherein the pair of spaced horizontal frame members of the storage member are adapted to be located adjacent the upper support surface of the movable base.

25. The removable mounting system of claim 24, wherein the base is movable by means of at least one set of laterally spaced wheels, wherein each wheel is rotatably mounted to wheel mounting structure interconnected with the upper support surface of the movable base and located beneath one of the pair of spaced horizontal frame members of the storage member.

26. The removable mounting system of claim 24, wherein the locking member comprises an elongated rod defining a pair of spaced ends, wherein each end of the locking rod is adapted to overlie one of the pair of spaced horizontal frame members of the storage member.

27. The removable mounting system of claim 26, wherein the locking structure comprises a locking slot defined by at least one mounting member interconnected with the upper support surface of the movable base.

28. The removable mounting system of claim 27, wherein at least an upper portion of the laterally facing entrance of the locking slot is adapted to be located vertically above the pair of spaced surfaces defined by the pair of spaced horizontal frame members of the storage member, and wherein the locking slot is configured such that movement of the elongated rod laterally into the locking slot is adapted to move the spaced ends of the elongated rod downwardly against the spaced surfaces defined by the pair of spaced horizontal frame members.

29. The removable mounting system of claim 28, wherein the upper portion of the locking slot is defined by a downwardly angled engagement surface extending inwardly from the slot entrance, and wherein the slot further includes a detent surface located inwardly of the downwardly angled engagement surface for engaging the elongated rod and retaining the elongated rod within the slot in a position wherein the spaced ends of the elongated rod are adapted to be engage the spaced surfaces defined by the pair of spaced horizontal frame members of the storage member.

30. A storage assembly adapted for movement relative to a supporting surface between a first position and a second position, comprising:
 a storage member having a base located at its lower end, wherein the base includes a movable supporting arrangement adapted for engagement with the supporting surface, wherein the movable supporting arrangement is adapted to support the storage member on the supporting surface and is adapted to provide movement of the storage member between its first and second positions;
 a guide assembly for guiding movement of the storage member during movement between the first and second positions, wherein the guide assembly includes a mounting member adapted to be secured to the supporting surface, and an extendible and retractable guide mechanism interconnected with the mounting member and with the base, wherein the extendible and retractable guide mechanism comprises a telescoping slide arrangement including a stationary guide member interconnected with the mounting member, and an extendible and retractable slide member interconnected with the base and slidably mounted to the stationary guide member; and
 a retainer mechanism for releasably maintaining the storage member in its first position, comprising a catch member mounted to one of the base and the guide assembly, and a movable retainer member mounted to the other of the base and the guide assembly, wherein the catch member includes an engagement surface with which the movable retainer member is engageable to maintain the storage member in its first position, wherein the retainer member is movable out of engagement with the engagement surface upon application of an axial force to the storage member tending to move the storage member from its first position toward its second position, to enable movement of the storage member to its second position, and wherein return movement of the storage member to its first position results in subsequent engagement of the retainer member with the engagement surface to releasably retain the storage member in its first position.

31. The storage assembly of claim 30, wherein the base includes a set of rotatable wheels adapted for engagement with the supporting surface and adapted to provide movement of the storage member thereon between the first and second positions.

32. The storage assembly of claim 31, wherein the guide member comprises an axially telescoping slide assembly interposed between the mounting member and the base, including a fixed-position guide member mounted to and extending from the mounting member, and an axially movable extension member interconnected with the fixed-position guide member and the base, wherein axial movement of the extension member relative to the guide member is operable to guide movement of the storage member between the first and second positions.

33. The storage assembly of claim 31, wherein the catch member includes a ramped surface extending from the engagement surface, wherein the movable retainer member is engageable with the ramped surface for guiding the movable retainer member into engagement with the engagement surface as the storage member is moved toward its first position.

34. The storage assembly of claim 33, wherein the movable retainer member is movably mounted to a housing for movement between an outward position and an inward position, and further comprising a biasing element interposed between the housing and the retainer member for biasing the retainer member toward its outward position.

35. The storage assembly of claim 34, wherein movement of the storage member toward its first position causes engagement of the retainer member with the ramped surfaced to move the retainer member toward its inward position against the force of the biasing element, and wherein movement of the retainer member past the engagement surface as the storage member is moved to its first position results in movement of the retainer member toward its outward position under the influence of the biasing element.

36. The storage assembly of claim 31, wherein the catch member is mounted to the mounting member and wherein the movable retainer member and housing are mounted to a lower wall defined by the base which overlies at least a portion of the mounting member when the storage member is in the first position.

37. The storage assembly of claim 31, further comprising a resilient bumper interposed between the mounting member and the base for cushioning impact between the storage member and the base when the storage member is moved to the first position.

38. In combination, a first member, a second member, and a system for altering the position of the first member relative to the second member, comprising a shim arrangement mounted to the first member for movement while mounted to the first member between a shimming position in which at least a portion of the shim arrangement is interposed between and engaged with the first and second members, and a withdrawn position in which the shim arrangement is withdrawn from between the fist and second members to provide direct engagement of the first and second members with each other, wherein the shim arrangement includes locating structure in a predetermined constant location on the first member both when the shim arrangement is in its shimming position and when the shim arrangement is in its withdrawn position, for cooperating with the second member to locate the second member relative to the first member.

39. The system of claim 38, wherein the first member comprises an article of furniture and the second member comprises a base structure adapted to support the article of furniture.

40. The system of claim 39, wherein the article of furniture comprises a storage member and wherein the base structure comprises a movable base member for providing movement of the storage member between an extended position and a retracted position.

41. The system of claim 40, wherein the shim arrangement comprises an upper locating member and a lower shim member located between the base member and the upper locating member, wherein the upper locating member is mounted in a fixed position to the base member and wherein the lower shim member is movably mounted to and between the base member and the upper locating member.

42. The system of claim 41, wherein the upper locating member is mounted in a fixed position to the base member via one or more openings in the upper locating member and one of more fasteners which extend through the one or more openings into engagement with the base member, and wherein the lower shim member is movably mounted via slot structure formed in the lower shim member and through which the one or more fasteners extend for providing movement of the lower shim member relative to the base member and the upper locating member while the one or more fasteners are in place.

43. The system of claim 42, wherein the lower shim member is laterally movable relative to the upper locating member to displace the lower shim member so that a shimming surface defined by the lower shim member is exposed when the lower shim member is moved laterally relative to the upper locating member so as to place the shim arrangement in its shimming position.

44. The system of claim 43, wherein the upper locating member includes a slot and wherein the lower shim member includes an opening aligned with the slot, wherein a tool is adapted for passage through the slot for engagement within the opening in the lower shim member, such that application of a transverse force to the tool engages the tool with an edge of the opening to move the lower shim member so as to place the shim arrangement in its shimming position, wherein the slot in the upper locating member accommodates transverse movement of the tool.

45. A shim system for use with an article of furniture and a support to which the article of furniture is adapted to be mounted, comprising two or more shim members adapted to be mounted to the support by a mounting arrangement adapted to provide fixed-position mounting of a first one of the shim members relative to the support and adapted to provide movable mounting of a second one of the shim members relative to the first shim member and relative to the support, wherein the second shim member is adapted to be located between the first shim member and the support and is movable between a shimming position in which the second shim member is adapted to be positioned between the article of furniture and the support, and a withdrawn position in which the second shim member is adapted to be withdrawn from between the article of furniture and the support and is adapted to provide direct engagement of the article of furniture with the support.

46. The shim system of claim 45, wherein the mounting arrangement comprises a pair of spaced connectors adapted for interconnection between the support and an upper one of the first and second shim members, and wherein the mounting arrangement further includes slot structure formed in a lower one of the first and second shim members through which the pair of connectors extend, wherein the slot structure and the pair of connectors are adapted to provide movement of the lower shim member relative to the support and relative to the upper shim member.

47. The shim system of claim 46, including a pair of lower shim members, each of which includes slot structure through which the pair of connectors extend, wherein each of the lower shim members are adapted to be movable separately relative to the support and the upper shim member between the shimming and withdrawn positions.

48. The shim system of claim 47, wherein the upper shim member includes first and second transverse slots, and wherein a lowermost one of the lower shim members includes an opening in alignment with the first slot and wherein an uppermost one of the lower shim members includes a slot in alignment with the opening and with the first slot, and wherein the uppermost one of the lower shim members further includes an opening spaced from the slot and in alignment with the second transverse slot in the upper shim member and wherein the lowermost one of the lower shim members includes a slot in alignment with the opening in the uppermost lower shim member and with the second slot in the upper shim member, wherein the tip of a tool is adapted to be inserted through the first and second slots in the upper shim member for engagement with the openings in the lower shim members, wherein application of a transverse force to the tool causes lateral movement of the lower shim members relative to the upper shim member, wherein the slot in the uppermost one of the lower shim members accommodates transverse movement of the tip of the tool and wherein the slot in the lowermost one of the second shim members receives a portion of the tip of the tool which projects through the opening in the uppermost one of the lower shim members to accommodate lateral movement of the lower and upper shim members, respectively.

* * * * *

UNITED STATES PATENT AND TRADEMARK OFFICE
CERTIFICATE OF CORRECTION

PATENT NO. : 6,416,143 B1
DATED : July 9, 2002
INVENTOR(S) : Steven L. Janson

It is certified that error appears in the above-identified patent and that said Letters Patent is hereby corrected as shown below:

Column 19,
Line 34, after "member" (2nd occurrence) insert -- is --;
Line 55, delete "dependent" and insert -- depending --;

Column 20,
Line 15, before "guide" insert -- base and the --;
Line 57, delete "composes" and substitute therefore -- comprises --;
Line 64, after "positions" insert -- , --;

Column 22,
Line 15, before "engage" delete "be";

Column 23,
Lines 22-23, delete "surfaced" and substitute therefore -- surface --;

Column 24,
Line 9, delete "of" and substitute therefore -- or --;
Line 33, after "use" insert -- in combination --.

Signed and Sealed this

Sixteenth Day of September, 2003

JAMES E. ROGAN
*Director of the United States Patent and Trademark Office*